(12) United States Patent
Yamaga et al.

(10) Patent No.: US 8,137,856 B2
(45) Date of Patent: Mar. 20, 2012

(54) FUEL CELL

(75) Inventors: Kenji Yamaga, Hitachi (JP); Tsutomu Okusawa, Hitachi (JP); Masaya Kozakai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 383 days.

(21) Appl. No.: 12/370,752

(22) Filed: Feb. 13, 2009

(65) Prior Publication Data

US 2010/0209803 A1 Aug. 19, 2010

(51) Int. Cl.
*H01M 8/10* (2006.01)
(52) U.S. Cl. .................................. 429/457; 429/514
(58) Field of Classification Search .................. 429/457
See application file for complete search history.

(56) References Cited

U.S. PATENT DOCUMENTS

| | | | |
|---|---|---|---|
| 2006/0228617 A1* | 10/2006 | An et al. | 429/38 |
| 2007/0105002 A1* | 5/2007 | Hashimoto et al. | 429/38 |
| 2007/0207365 A1* | 9/2007 | Ohnuma | 429/38 |
| 2008/0145740 A1* | 6/2008 | Blein | 429/34 |

FOREIGN PATENT DOCUMENTS

| | | |
|---|---|---|
| JP | 2004-165043 | 6/2004 |
| JP | 2007-027037 | 2/2007 |

* cited by examiner

*Primary Examiner* — John S Maples
(74) *Attorney, Agent, or Firm* — Antonelli, Terry, Stout & Kraus, LLP.

(57) ABSTRACT

Excellent gas sealing properties were difficult to achieve with a structure that uses a meal material to control material cost and does not increase the number of components. A cell is configured by using a metal separator having at least one protruding structure between a manifold and an electrode channel, and having a communicating channel structure that forms a fluid circulating space by being folded back at the side containing a connection so that the tip of the protruding structure is in contact with a surface of the separator. Accordingly, a gas channel from the manifold to an electrode surface can be easily formed integrally. This can be applied to a metal material easily. Further, the present invention can provide excellent gas sealing properties.

17 Claims, 5 Drawing Sheets

Cross section A-A'

Cross section A-A'

COMPARATIVE EXAMPLE (a)

COMPARATIVE EXAMPLE (b)

Cross section B-B'

FUEL CELL

BACKGROUND OF THE INVENTION

1. Field of the Invention

The present invention relates to a fuel cell and specifically to a structure of a channel for taking in fuel or oxygen supplied from a manifold.

2. Description of the Related Art

A solid polymer fuel cell that uses a proton conducting polymer film for a proton exchange membrane is a power generation system in a test and development phase for commercialization, and has a problem of expensive material cost.

A separator is one of components using high-cost materials in a fuel cell. A separator refers to an electron-conductive plate including gas channel grooves for isolating two reaction gases so that they will not mix.

Since internal environment of a fuel cell is a corrosive atmosphere while the fuel cell is generating electricity, the separator is required to be highly corrosion-resistant. Besides, a separator material needs such characteristics as structural strength, gas impermeability, and low resistance.

Thus, at present, as the separator material, a dense graphite plate on which gas channels are provided or a mold graphite separator in which channels are formed in resin mold graphite made of artificial graphite particles caked with a resin is used.

Meanwhile, a metal separator using metal materials may reduce the cost. Since a metal material not only has high strength and can be thinned but also has excellent workability, the material cost and machining cost per separator can be significantly reduced.

In general, the metal material forms corrosion products under such environment where the fuel cell generates power. However, a metal separator whose corrosion resistance is improved by forming a special material on a surface or applying conductive protective paste on the surface is now being developed.

As a carbon separator has a thickness of about several millimeters or more, channels can be formed independently on a front side and a back side. However, in the case of the metal separator, a plate having a thickness of 0.5 mm or less is pressed to form gas channels thereon. As a result, concavo-convex parts of the channels are formed that are reflections of a shape of the front side of the plate on the back side.

When a separator is formed by combining a plurality of metal plates, the channel shapes on the front and the back sides are independent to each other; however, the cost is high. To form a separator in the most inexpensive manner, it is preferable to fabricate the separator by processing only a single metal plate.

In this case, since gas channels are formed by utilizing the front and the back sides of a plate in which the channels were formed, only common channel parts on the front and back sides will be formed. For example, if an introducing channel that directs gas from a manifold to an electrode surface is press-formed in a metal plate, gas from the manifold flows into the both front and back sides of one separator, which thus makes power generation impossible.

Thus, it is difficult to form a channel connecting the manifold with the electrode surface, on a metal plate.

For this reason, Japanese Patent Application Publication No. 2007-02737 discloses a separator using a metal material in which a gas channel to the electrode surface is formed by devising a configuration of materials around the manifold.

However, since the separator with a slit-shaped structure between the manifold and the electrode channel has a relatively soft material such as an electrolyte material, or a seal material arranged on its surface, the separator has a problem that the material is deformed to fit the concavo-convex parts on the surface, and thus supplied hydrogen and air are mixed in a cell. When hydrogen and air are mixed in the cell, a reaction progresses locally, thus increasing distribution of temperatures. This is one of reasons for deteriorated cell performance.

Thus, Japanese Patent Application Publication No. 2004-165043 proposes an approach using a separator substrate and two frames for forming a separator so as to prevent a gas crossover from occurring at a portion where the separator comes into contact with a proton exchange membrane.

In addition, in Japanese Patent Application Publication No. 2007-027037, the surface of the slit-like structure on which the electrolyte material or the seal material is arranged is concavo-convex shaped. By contrast, the above proposal states that a flat and smooth surface can prevent deformation of a material, and consequently, excellent sealing properties can be maintained.

SUMMARY OF THE INVENTION

However, the above proposal requires a plurality of frames in addition to a separator substrate, thus inevitably increasing the number of components. Furthermore, since the fabrication of a stacked cell involves stacking the separators in the flipped condition, integration of components is necessary to avoid any displacement of the components.

Specifically, the above proposal requires a process of integrating the added frames to the separator substrate by using such an approach as adhesion. This causes a problem of increase in number of fabrication processes, and eventual increase in cost.

Hence, there was a need for a separator that uses a meal material to control the material cost, has a structure that does not result in the increased number of components, and has excellent gas sealing properties.

Hence, an object of the present invention is to provide a fuel cell that uses a metal separator and has excellent gas sealing performance.

A fuel cell according to the present invention includes: proton exchange membranes each integrally formed with an anode and a cathode; anode diffusion layers arranged in close contact with the anodes, respectively; cathode diffusion layers arranged in close contact with the cathodes, respectively; and metal separators made of a metal and each formed between two of the proton exchange membranes when a plurality of the proton exchange membranes are formed, each metal separator including an anode manifold for supplying fuel to the anode formed on one of the two proton exchange membranes and a cathode manifold for supplying oxygen to the cathode formed on the other one of the two proton exchange membranes.

Here, the fuel cell including the plurality of proton exchange membranes formed therein was described; however, the present invention is not necessarily limited to the fuel cell in which a plurality of proton exchange membranes are formed, but is applicable to a fuel cell that has one proton exchange membrane sandwiched by two metal separators.

Then, each metal separator includes a bent anode communicating channel structure that is smaller than the anode manifold, and has a protruding structure formed so as to form a fuel supplying channel.

In addition, each metal separator includes a bent cathode communicating channel structure that is smaller than the cathode manifold, and has protruding structures formed so as to form the oxygen supplying channel.

The fuel cell of the present invention may have both the anode communicating channel structure and the cathode communicating channel structure. Alternatively, even with only one of the anode communicating channel structure and the cathode communicating channel structure, predetermined benefits can be achieved.

Additionally, in the following description, the anode and/or the cathode may be simply designated as the electrode, the anode diffusion layer and/or the cathode diffusion layer as the diffusion layer, the anode manifold and/or the cathode manifold as the manifold, and the anode communicating channel structure and/or the cathode communicating channel structure as the communicating channel structure.

This is because the structure does not differ significantly whether these components are on the anode side or on the cathode side, and thus a description thereof is given for either of the sides as a representative.

In addition, in the fuel cell according to the present invention, it is preferable that tips of the protruding structures be in contact with a surface of a metal separator.

Then, it is preferable that in a same metal separator, communicating channel structures be formed in a fluid inlet manifold and a fluid outlet manifold, respectively, in the single metal separator.

It is also preferable that a relation between t and S satisfy $0.5t \leqq S \leqq 4.0$, where t represents a plate thickness of the metal separator, and S represents a distance between a surface of the communicating channel structure and a surface of the metal separator facing the communicating channel structure, the communicating channel structure and the metal separator forming a circulating space for fluid.

Then, the plate thickness of the metal separator is preferably smaller than 0.5 mm.

It is also preferable that a material of the metal separator contain at least titanium.

Then, a sealing member is formed on the metal separator.

Also in the present invention, in order to reduce the number of fabrication man-hours and improve the sealing properties by using a metal separator, a fuel cell is formed with metal separators. The metal separator includes a proton exchange membrane in which an anode and a cathode are integrated, an anode diffusion layer, a cathode diffusion layer, and a sealing member. The metal separator also includes a communicating channel structure fabricated within a manifold, coupled with a metal plate, which is a main body, on at least one side, having at least one protruding structure, and forming a circulating space for fluid by being folded back at the side containing a connection so that a tip of the protrusion is in contact with a surface of the separator.

Since the communicating channel structure located between the manifold and the electrode is in contact with a proton exchange membrane material arranged thereon on a planar surface, deformation of the proton exchange membrane can be minimized and no effect is given to a shape of a gas seal, which can thereby control a leak.

In addition, a metal separator is used which includes a communicating channel structure fabricated within a manifold, coupled with a meal plate material, which is a main body, on at least one side, having at least one protruding structure, and forming a circulating space for fluid by being folded back at the side containing a connection so that a tip of the protruding structures is in contact with a surface of the separator.

In addition, a single cell may be fabricated with two separators on which the communicating channel structures are formed.

The communicating channel structure includes a planar plate material and protruding structures, and a space between the planar plate material and the separator surface is basically determined by a protrusion height of the protruding structure.

Since gas or the like flows through the space, gas flow resistance will increase when the space is too narrow. If the flow resistance increases, power consumption of an auxiliary machine such as a blower will increase, affecting efficiency of the overall system.

Furthermore, by specifying the plate thickness and the distance S between the surface of the communicating channel structure and the surface of the separator facing the communicating channel structure, the entire thickness of the separator can be controlled.

The present invention can provide a fuel cell that uses a meal material that can control material cost, is structured to prevent an increase in the number of components, and has excellent gas sealing properties.

DESCRIPTION OF THE PREFERRED EMBODIMENTS

Embodiments of the present invention will be described with reference to the following Examples.

Example 1

Figure 1:
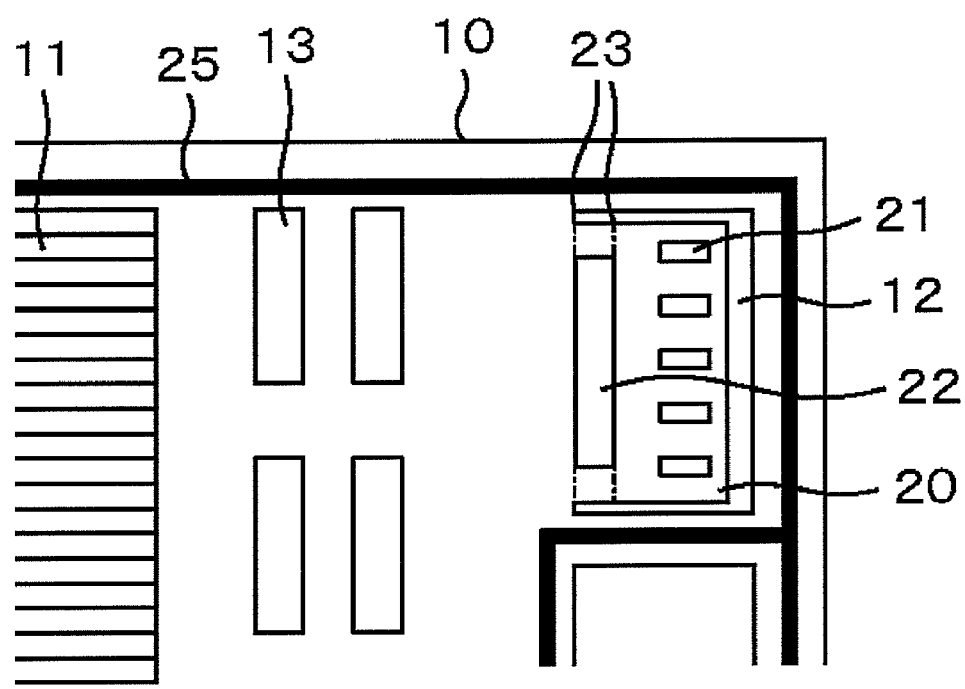
FIG. 1 is a view showing a part of a separator used in an Example (before a communicating channel structure is bent).

As shown in FIG. 1, by using stainless steel (SUS316) having a plate thickness of 0.5 mm, a pressing plate 10 was obtained in which work electrode channels 11 and a flow controller 13 were formed by press working. The work electrode channels 11 allow gas necessary for electrochemical reactions to flow. The flow controller 13 is a structure for uniformly distributing gas into the channels.

At the same time, a communicating channel structure 20 connected to the pressing plate was formed in a manifold 12 for circulating and distributing gas or cooled water to each cell after lamination. The communicating channel structure 20 includes protruding structures 21 being 0.15 mm high, a fluid circulating part 22, and a preprocessing work area 23 for bending process Then, ethylene-propylene-diene rubber (EPDM) varnish was applied onto the pressing plate 10 by a screen printing method to form a sealing member 25, and then the pressing plate 10 was subjected to vacuum firing at 150° C.

Figure 2:
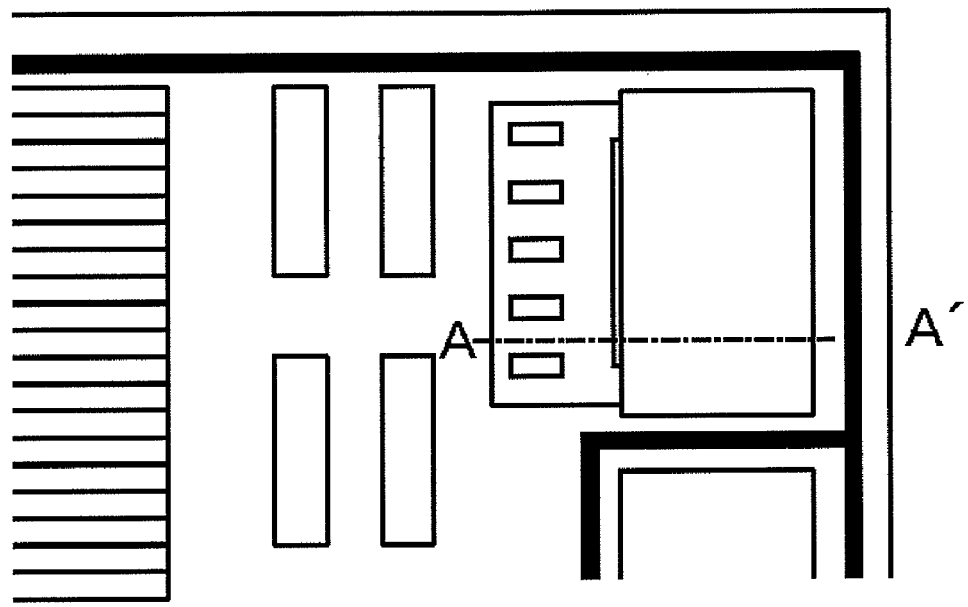
FIG. 2 is a view showing the part of the separator used in Example (after the communicating channel structure is bent).
Figure 2:
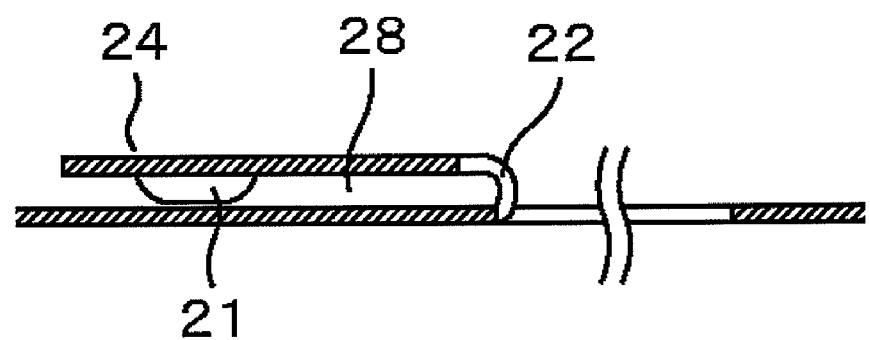

At a processed portion for bending 23, the communicating channel structure 20 of the pressing plate was bent so that the tips of the protruding structures 21 touched the surface of the pressing plate 10, as shown in FIG. 2, and thus communicating channels were formed.

The surface of the pressing plate and the communicating channel structure form a space by height of the protruding structures, the space then being a channel 28 for connecting the manifold 12 with the electrode channel 11 for gas.

Although concave portions of the protruding structures 21 are formed on the back surface 24 of the communicating channel structure, the remaining area other than the concave portions is flat. An area that sealing members of the separators face when combined to form a cell is also flat.

Thus, although an electrolyte material is arranged adjoining the back surface 24 of the communicating channel structure, deformation thereof can be controlled to the minimum. Consequently, a gas leak due to deformation of the electrode electrolyte material can be prevented.

Thus, the separator of Example 1 was fabricated.

Example 2

By using stainless steel (SUS316) having plate thickness of 0.2 mm, a pressing plate was obtained in which channels were formed by press work. The channels allow gas necessary for electrochemical reactions to flow. In the manifold, a communicating channel structure coupled with the pressing plate was formed. The communicating channel structure has protruding structures being 0.2 mm high, a fluid circulating part, and a processed portion for bending.

After a sealing member was formed, the communicating channel structure was bent and made communication channels.

Thus, the separator of Example 2 was fabricated.

Example 3

By using a three-layer structured clad material having titanium surfaces and a stainless steel center layer and having plate thickness of 0.2 mm, a titanium clad pressing plate was obtained that in which channels for flowing gas necessary for electrochemical reactions were formed by press working. In a manifold, a communicating channel structure coupled with the pressing plate was formed. The communicating channel structure has protruding structures being 0.2 mm high, a fluid circulating part, and a processed portion for bending.

Figure 3:
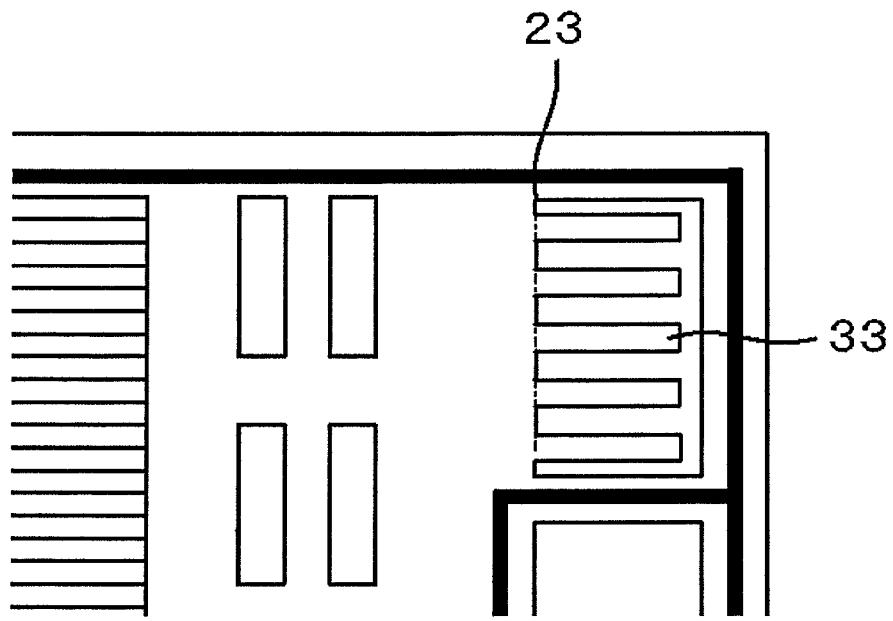
FIG. 3 is a view showing a part of the separator used in Comparative Example.
Figure 3:
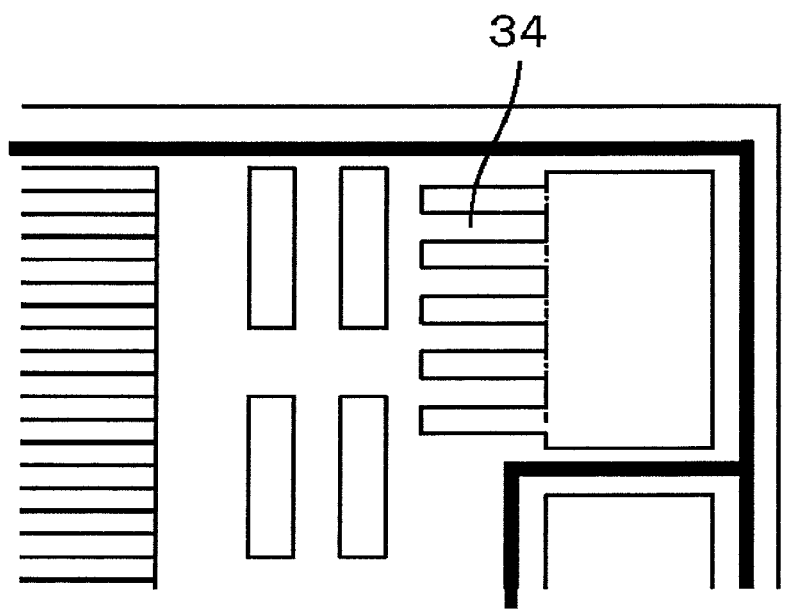

The surfaces of the gas channel were coated with gold by sputtering. Then, the separator was fabricated similarly to Example 2. Thus, the separator of Example 3 was fabricated Comparative Example As shown in FIG. 3a, by using stainless steel having plate thickness of 0.5 mm, a pressing plate was formed in which channels for flowing gas necessary for electrochemical reactions were formed by press working. At the same time, bar-like structures 33 having a width of 1.5 mm and arranged at a pitch of 1.5 mm, and a processed portion for bending 23 were formed in a manifold for flowing and distributing gas or cooled water to each cell after lamination.

Then, EPDM varnish was applied on the pressing plate by a screen printing method to form a sealing member, and then the pressing plate was subjected to vacuum firing at 150° C.

The bar-like structures 33 of the pressing plate were bent, as shown in FIG. 3b, and made the communicating channels 34 connecting the manifold and the electrode channels for gas.

Thus, the separator of Comparative Example was fabricated

Figure 4:
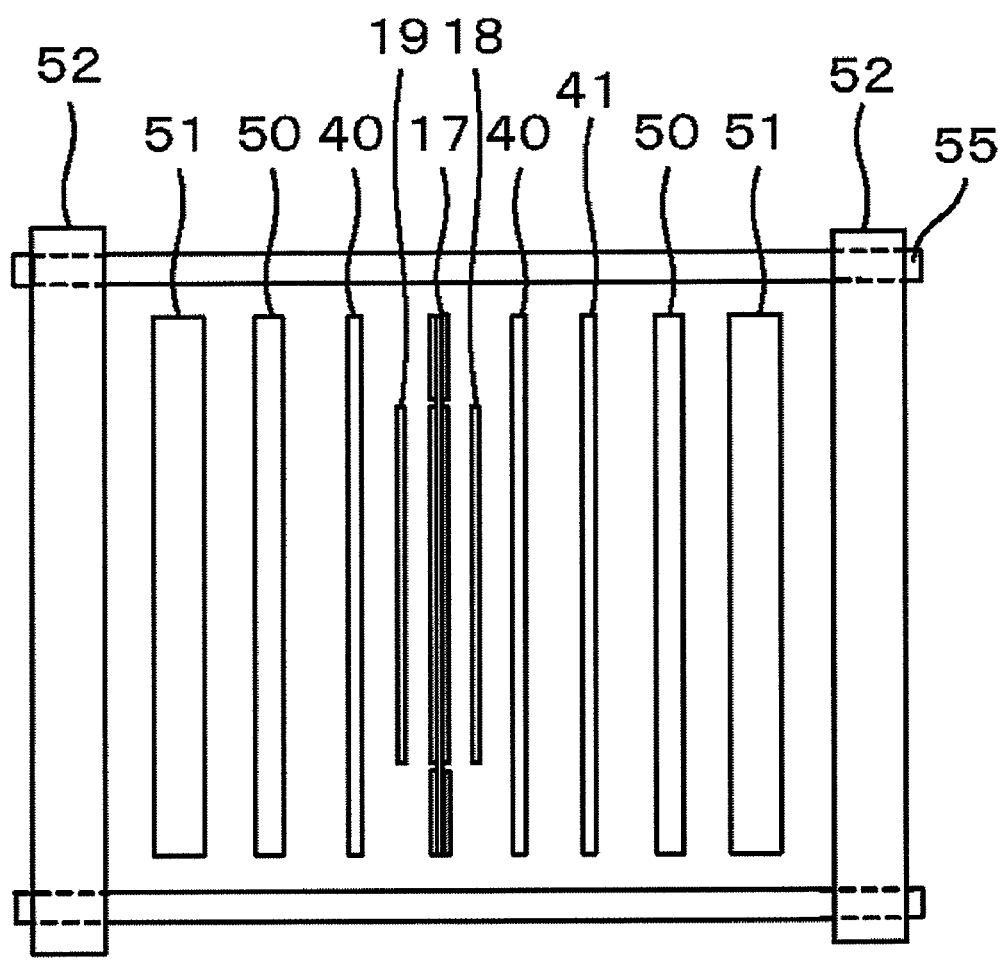
FIG. 4 is a diagram showing the structure of a single cell.

As shown in FIG. 4, a cell was assembled by laminating two separators 40 prepared in Example 1, a membrane/electrode assembly 17, a cathode diffusion layer that is a carbon paper with a controlled water repellency by dispersing polytetrafluoroethylene (PTFE) on a surface, an anode diffusion layer 19, and a cooling separator 41, sequentially arranging current collectors 50, insulating plates 51 and end plates 52 on the outer sides thereof, and fixing the laminated body by bolts 55 so that the entire load would be 0.5 MPa.

The separators of Examples 2, 3 and Comparative Example were similarly fabricated into single cells.

For each of the cells of Example 1 and Comparative Example 1, inlet and outlet valves were provided for both an anode line and a cathode line, and a pressure gauge was placed between each inlet valve and the cell. With the cathode inlet valves and the both outlet valves closed, nitrogen was supplied to the anode line till a gauge pressure of 10 kPa was reached. Then, the anode inlet valve was closed, and the pressure of the anode line after 10 minutes was compared.

As a result, a pressure value of the anode line was 8.5 kPa in Example 1, while a pressure value of the anode line was 4.9 kPa in Comparative Example.

It is believed that, in Comparative Example, the pressure drop was resulted from leakage of the nitrogen supplied to the anode line into the cathode line or a cooling water line within the cell.

A part with a different structure, that is, a communicating channel structure from the manifold to the electrode is considered a cause thereof.

In other words, in Comparative Example, it is believed that an electrolyte material arranged on the bar-like structures connected to the manifold deformed to fit a concavo-convex shape on the surface, adhesiveness necessary for achieving the sealing performance lowered, and consequently, a leakage within the cell occurred. In contrast, in Example 1, since the electrolyte side of the communicating channel structure has a planar surface, the deformation of the proton exchange membrane is controlled to the minimum, and consequently the seal properties within the fuel improves.

For each cell of Example 1 and Comparative Example 1, pressure gauges were connected to the inlet and the outlet of the anode line and the inlet and the outlet of the cathode line, respectively. The outlets were opened to the atmosphere.

A value of pressure loss was measured while nitrogen was being supplied to the cathode line and the anode line. The amount of nitrogen supplied to the cathode line corresponded to that at a current density of $0.5$ A/cm$^2$ and at a utilization of 85%. The amount of nitrogen supplied to the anode line corresponded to that at a current density of $0.5$ A/cm$^2$ and at a utilization of 50%. Additionally, the utilization was defined as a proportion of the amount of gas consumed in power generation to the amount of supplied gas, and the pressure loss of each gas line was defined as:

Pressure Loss=Pressure value at the inlet−pressure value at the outlet

As a result, the pressure loss in Example 1 was 5.5 kPa for the anode and 15.0 kPa for the cathode, while the pressure loss in Example 2 was 2.5 kPa for the anode and 6.0 kPa for the cathode.

It is believed that this was caused by a difference in channel resistance of the communicating channel structure between the manifold and the electrode channel.

When a necessary amount of gas is supplied to a cell, an auxiliary machine with a relatively small discharge pressure can be used in Example 2. Since a pump or blower having a small discharge pressure generally tends to show low power consumption, power generation efficiency of a system using an auxiliary machine with a small discharge pressure increases if characteristics of a fuel cell are identical in a system that covers driving electricity of the auxiliary machine by the fuel cell.

As a result of further elaborate review, for the relation of the plate thickness t of the separator and the height S of the communicating channel structure, when S falls below 0.5t, a pressure loss value of the separator becomes excessive, and selection of an auxiliary machine to be combined to the separator becomes difficult. In addition, when S exceeds 4.0t, thickness of the separator increases, and thus the volume of an entire cell will be large. If the plate thickness t becomes too thick, weight of the separator will increase and forming of channels or protrusions by press working will become difficult. Thus, a material being 0.5 mm in thickness or more has almost no benefit to use.

For the reasons described above, it can be said that Example 2 has better basic characteristics as a separator for a fuel cell than Example 1. In terms of the relation of pressure loss and cell volume, the followings are preferable. The plate thickness t of the separator is 0.5 mm or less. A relation of t and height S of the communicating channel structure is in the range of $0.5t \leqq S \leqq 4.0t$.

For the cells in Example 2 and Example 3, a power generation test was conducted. In the power generation test, hydrogen was supplied as an anode gas and air was supplied as a cathode gas. Each gas was added with a predetermined amount of steam by passing through a bubbler at 60° C., beforehand. Also in the power generation test, a current set to a current density of 0.5 A/cm$^2$ by the electron loader was applied.

In the power generation test, hydrogen utilization was set to 85% and oxygen utilization was set to 50%. Water of approximately 0.25 L/min that can be controlled to arbitrary temperatures was supplied to a cooling cell and the temperature of the single cell was controlled so that electricity could be generated in a range of 70 to 73° C. For the temperature of the single cell, the temperature of the center part of an electrode of a power generating separator was measured by using a cell temperature measuring port provided separately. For each of the cells, test continued up to 1000 hours, changes in cell voltage thereof were recorded, and drop rates of the cell voltage for the last 100 hours in the test range were compared among the respective cells.

Consequently, while the voltage drop rate was approximately 3 mV/100 hours in Example 2, the voltage drop rate was approximately 0.15 mV/100 hours in Example 3, which showed that characteristics of Example 3 were better.

It is believed that this is because titanium, a material for the separator used in Example 3, has excellent corrosion resistance and can control elution of metal ions, deterioration of an electrolyte material is small, and an increase of resistance components can be minimized because of gold coated on the surface of the channels.

In addition, although hydrogen was used as fuel in the Examples, it has been found out that, even when a liquid (methanol, for example) with which electricity can be electrochemically generated is used, functions of this proposal can work effectively and achieve effects.

Figure 5:
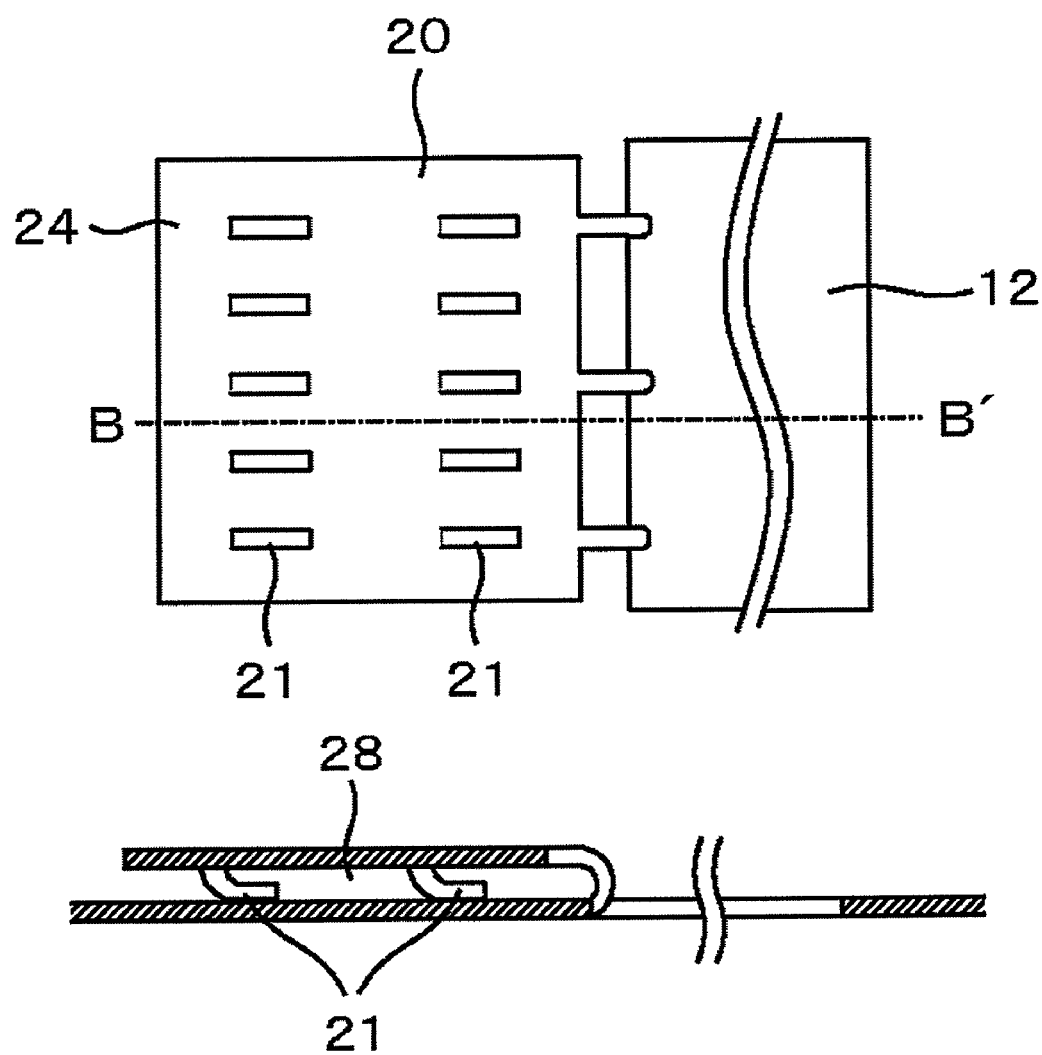
FIG. 5 is a view showing another form of Example.

Alternatively, as a configuration of a communicating channel structure, a protrusion configuration as shown in FIG. 5 can also be conceived. In FIG. 5, by changing the shape of the protrusion configuration, shape restoring ability is given to the protrusions. For this reason, when appropriate tightening force is applied to a sealing member so as to exhibit sealing capability, the protrusions deform, thus preventing concentration of stress on the protrusions, and stress can be applied, as has been designed, to the surrounding sealing members. Consequently, a fuel cell with excellent sealing capability can be provided.

As described above, in a fuel cell using the separator of the present invention, it is easy to integrally form gas channels from a manifold to an electrode surface. The separator of the present invention can be easily applied also to metal materials. Furthermore, the separator of the present invention can have excellent gas sealing properties.

The present invention relates to a fuel cell that can utilize electrochemical reactions and thus extract energy from fuel and an oxidant.

EXPLANATION OF REFERENCE NUMERALS

11 . . . electrode channel, 12 . . . manifold, 13 . . . flow controller, 18 . . . cathode diffusion layer, 19 . . . anode diffusion layer, 20 . . . communicating channel structure, 21 . . . protruding structure, 22 . . . fluid circulating part, 23 . . . processed portion for bending, 24 . . . communicating channel structure back surface, 25 . . . sealing member, 28 . . . connecting channel of a manifold and an electrode channel, 33 . . . bar-like structure, 34 . . . communicating channel, 40 . . . separator, 41 . . . cooling separator, 50 . . . current collector, 51 . . . isolating plate, 52 . . . end plate, 55 . . . bolt

What is claimed is:

1. A fuel cell comprising:
   proton exchange membranes each integrally formed with an anode and a cathode;
   anode diffusion layers arranged in close contact with the anodes, respectively;
   cathode diffusion layers arranged in close contact with the cathodes, respectively; and
   metal separators made of a metal plate and each formed between two of the proton exchange membranes when a plurality of the proton exchange membranes are formed, each metal separator including an anode manifold for supplying fuel to the anode formed on one of the two proton exchange membranes and a cathode manifold for supplying oxygen to the cathode formed on the other one of the two proton exchange membranes, —wherein
   each metal separator further includes:
   an anode communicating channel formed by bending an anode communicating channel structure, which is integrally linked with the metal plate via a preprocessing work area and has a metal plate part on which a protruding structure is formed so as to form a fuel supplying channel, at the preprocessing work area in such a manner that the protruding structure faces the metal plate; and
   a cathode communicating channel formed by bending a cathode communicating channel structure, which is integrally linked with the metal plate via preprocessing work area and has a metal plate part on which a protruding structures is formed so as to form an oxygen supplying channel, at the preprocessing work area in such a manner that the protruding structure faces the metal plate.

2. The fuel cell according to claim 1, wherein
   each of the preprocessing work parts is integrally linked with an edge part of an opening in the corresponding manifold, and
   tips of the protruding structures are in contact with a surface of the metal plate forming the metal separator.

3. The fuel cell according to claim 1, wherein
   communicating channel structures are formed in a fluid inlet manifold and a fluid outlet manifold, respectively, in the single metal separator.

4. The fuel cell according to claim 1, wherein
   a relation between t and S satisfies $0.5t \leqq S \leqq 4.0t$,
   where t represents a plate thickness of the metal plate forming the metal separator, and S represents a height of the communicating channel structure having the protruding structure forming a circulating space for fluid.

5. The fuel cell according to claim 1, wherein a plate thickness t of the metal plate forming the metal separator is smaller than 0.5 mm.

6. The fuel cell according to claim 1, wherein materials of the metal plate forming the metal separator contain at least titanium.

7. The fuel cell according to claim 1, wherein tips of the protruding structures are in contact with a surfaces of the metal plates.

8. The fuel cell according to claim 7, wherein the anode communication channel is formed between the surface of the metal plate and a surface of the metal plate part on which the protruding structure is formed, the anode communication channel having a height corresponding to a height of the protruding structure.

9. The fuel cell according to claim 8, wherein the cathode communication channel is formed between the surface of the metal plate and a surface of the metal plate part on which the protruding structure is formed, the cathode communication channel having a height corresponding to a height of the protruding structure.

10. The fuel cell according to claim 7, wherein the cathode communication channel is formed between the surface of the metal plate and a surface of the metal plate part on which the protruding structure is formed, the cathode communication channel having a height corresponding to a height of the protruding structure.

11. A fuel cell comprising:
a proton exchange membrane integrally formed with an anode and a cathode;
an anode diffusion layer arranged in close contact with the anode;
a cathode diffusion layer arranged in close contact with the cathode;
a first metal separator formed on a side opposite the anode formed on the proton exchange membrane, the first metal separator including an anode manifold for supplying fuel to the anode; and
a second metal separator formed on a side opposite the cathode formed on the proton exchange membrane, the second metal separator including a cathode manifold for supplying oxygen to the cathode,
wherein the first metal separator is formed of a metal plate and includes an anode communicating channel formed by bending an anode communicating channel structure, which is integrally linked with the metal plate via a preprocessing work area and has a metal plate part on which a protruding structure is formed so as to form a fuel supplying channel, at the preprocessing work area in such a manner that the protruding structure faces the metal plate.

12. The fuel cell according to claim 11, wherein a tip of the protruding structure is in contact with a surface of the metal plate.

13. The fuel cell according to claim 12, wherein the surface of the metal plate and a surface of the metal plate part on which the protruding structure is formed form the anode communication channel, the anode communication channel having a height corresponding to a height of the protruding structure.

14. A fuel cell comprising:
a proton exchange membrane integrally formed with an anode and a cathode;
an anode diffusion layer arranged in close contact with the anode;
a cathode diffusion layer arranged in close contact with the cathode;
a first metal separator formed on a side opposite the anode formed on the proton exchange membrane, the first metal separator including an anode manifold for supplying fuel to the anode; and
a second metal separator formed on a side opposite the cathode formed on the proton exchange membrane, the second metal separator including a cathode manifold for supplying oxygen to the cathode,
wherein the second metal separator is formed of a metal plate and includes a cathode communicating channel formed by bending a cathode communicating channel structure, which is integrally linked with the metal plate via a preprocessing work area and has a metal plate part on which a protruding structure is formed so as to form an oxygen supplying channel, at the preprocessing work area in such a manner that the protruding structure faces the metal plate.

15. The fuel cell according to claim 14, wherein the first metal wherein the first metal separator is formed of a metal plate and includes an anode communicating channel formed by bending an anode communicating channel structure, which is integrally linked with the metal plate via a preprocessing work area and has a metal plate part on which a protruding structure is formed so as to form a fuel supplying channel, at the preprocessing work area in such a manner that the protruding structure faces the metal plate.

16. The fuel cell according to claim 14, wherein a tip of the protruding structure is in contact with a surface of the metal plate.

17. The fuel cell according to claim 16, wherein the surface of the metal plate and a surface of the metal plate part on which the protruding structure is formed form the cathode communication channel, the cathode communication channel having a height corresponding to a height of the protruding structure.

* * * * *